United States Patent
Tan et al.

(10) Patent No.: US 8,936,037 B2
(45) Date of Patent: Jan. 20, 2015

(54) OUTLET PIPE STRUCTURE OF A FAUCET

(71) Applicant: Globe Union Industrial Corp., Taichung (TW)

(72) Inventors: Wanhong Tan, Shen Zen (CN); Xiaomao Tang, Shen Zen (CN); Yaohui Ni, Shen Zen (CN); Tingjin Pan, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 78 days.

(21) Appl. No.: 13/773,507

(22) Filed: Feb. 21, 2013

(65) Prior Publication Data

US 2014/0230935 A1 Aug. 21, 2014

(51) Int. Cl.
*F16K 21/00* (2006.01)
*F16L 37/252* (2006.01)
*E03C 1/02* (2006.01)
*E03C 1/04* (2006.01)
*F16L 37/248* (2006.01)

(52) U.S. Cl.
CPC ............. *E03C 1/0404* (2013.01); *F16L 37/248* (2013.01)
USPC ..................... 137/315.01; 137/15.09; 137/801

(58) Field of Classification Search
CPC ....... E03C 1/0404; E03C 1/04; E03C 1/0401; E03C 1/0402; E03C 1/0403; E03C 2001/0416; F16L 37/248; F16L 37/24
USPC ..................... 137/15.09, 315.01, 315.12, 801; 138/39, 44, 109, 114, 116; 239/19, 26, 239/27
See application file for complete search history.

(56) References Cited

U.S. PATENT DOCUMENTS

| | | | | |
|---|---|---|---|---|
| 5,560,548 A * | 10/1996 | Mueller et al. | ................. | 239/442 |
| 5,669,417 A * | 9/1997 | Lian-Jie | ........................ | 137/801 |
| 5,924,451 A * | 7/1999 | Kuo | ............................... | 137/801 |
| 7,082,966 B2 * | 8/2006 | Kuo | ............................... | 137/801 |
| 7,992,590 B2 * | 8/2011 | Meehan et al. | ................ | 137/801 |
| 2007/0200009 A1 * | 8/2007 | Mueller | ........................ | 239/444 |
| 2010/0071778 A1 * | 3/2010 | Nelson et al. | ............... | 137/15.01 |
| 2010/0180375 A1 * | 7/2010 | Meehan et al. | .................... | 4/695 |
| 2011/0079307 A1 * | 4/2011 | Marty et al. | .................. | 137/801 |
| 2011/0167557 A1 * | 7/2011 | Tan | ...................................... | 4/675 |
| 2011/0174403 A1 * | 7/2011 | Lin | ............................... | 137/602 |
| 2011/0272938 A1 * | 11/2011 | Lin | ............................... | 285/330 |
| 2012/0144650 A1 * | 6/2012 | Nelson et al. | ................... | 29/428 |
| 2012/0227843 A1 * | 9/2012 | Thomas et al. | ................ | 137/603 |
| 2013/0020794 A1 * | 1/2013 | Stokes et al. | ...................... | 285/8 |

FOREIGN PATENT DOCUMENTS

CN 201606557 U 10/2010

* cited by examiner

*Primary Examiner* — Stephen M Hepperle
*Assistant Examiner* — Frederick D Soski
(74) *Attorney, Agent, or Firm* — Alan D. Kamrath; Kamrath IP Lawfirm, P.A.

(57) ABSTRACT

An outlet pipe structure of a faucet contains a metal tube including metal tube, a hose assembly, a hose assembly, and a seat. The metal tube has a first segment, a second segment, and a channel. The first segment includes a first recess, and the second segment has a pedestal. The hose assembly includes: a hose having a passage, an inlet end, and an outlet end; an inlet connector having at least one locking block; an outlet connector having at least boss. The seat includes a first slot, a second slot, a connecting orifice. The connecting orifice has at least one trough with two opposite retaining faces. The seat also includes at least one coupling tab formed on an outer wall thereof and coupling with the pedestal of the second segment after the seat is fixed.

11 Claims, 11 Drawing Sheets

OUTLET PIPE STRUCTURE OF A FAUCET

FIELD OF THE INVENTION

The present invention relates to an outlet pipe structure of a faucet.

BACKGROUND OF THE INVENTION

Conventional outlet pipe of a faucet is cast molded from copper material, so its production cost is high.

CN Publication No. 201606557U discloses that a composite faucet is comprised of a filler body and a housing, but such a structure is not applied in an outlet pipe of a faucet. However, it is difficult to machine the filler body of the composite faucet so as to form an inlet, an outlet, and a channel. Also, the machining cost is high.

In addition, the channel has a channel tube inserted therein, but it cannot be embodied. Due to a flexible pipe or a plastic pipe is flexible, two ends of the flexible pipe or the plastic pipe cannot connect with the inlet and the outlet, thus leaking water and dropping easily. If the copper pipe or an aluminum pipe is used as the outlet pipe of the faucet, it is easy to be fixed, yet its flexibility is too poor to insert into a curved channel. Likewise, an opening of the filler body screws with a threaded connector, but the filler body is made of cements, calcium carbonates or gypsums, so the threaded connector looses easily, thus leaking water.

The present invention has arisen to mitigate and/or obviate the afore-described disadvantages.

SUMMARY OF THE INVENTION

The primary object of the present invention is to provide an outlet pipe structure of a faucet which is capable of overcoming the shortcomings of the conventional outlet pipe structure of the faucet.

To obtain the above objectives, an outlet pipe structure of a faucet provided by the present invention contains:

a metal tube including a first segment, a second segment, and a channel communicating with the first segment and the second segment; the first segment having a first recess defined on an inner wall thereof adjacent to a first opening; and the second segment having a pedestal disposed on a peripheral side of a second opening;

a hose assembly including a hose having a passage, an inlet end, and an outlet end; an inlet connector connected with the inlet end and having at least one locking block mounted on an outer wall of the inlet connector; an outlet connector coupled with the outlet end and having at least boss arranged around an outer wall of the outlet connector; the hose assembly being inserted from the first segment of the metal tube such that the outlet connector reaches to the second segment via the channel, and one of the at least one boss retains in the first recess so that the hose assembly is fixed in the metal tube;

a seat including a first slot, a second slot, a connecting orifice communicating with the first slot and the second slot; the connecting orifice having at least one trough defined on an inner wall thereof and having two opposite retaining faces formed on one side of the seat relative to the second slot; the at least one locking block passing through the at least one trough and retaining with the two opposite retaining faces after the seat rotates a predetermined degrees, such that the seat is fixed on the inlet connector of the hose assembly; the seat also including at least one coupling tab formed on an outer wall thereof and coupling with the pedestal of the second segment after the seat is fixed.

The outlet pipe structure of the faucet further contains two bolts, the pedestal of the second segment of the metal tube having two screwing holes; the seat also including two coupling tabs formed on the outer wall thereof, and each coupling tab having an aperture; each bolt screwing with a respective one of the two screwing holes of the pedestal via the aperture of the each coupling tab, such that the seat is screwed with the pedestal of the metal tube.

The inlet connector has two locking blocks symmetrically mounted the outer wall thereof; the connecting orifice has two troughs symmetrically defined on the inner wall thereof so as to insert the two locking blocks and to retain with the two opposite retaining faces after the seat rotates 90 degrees clockwisely or anticlockwisely.

The outlet connector has four bosses isometrically arranged around the outer wall thereof so that one of the four bosses retains in the first recess.

The inlet connector also has a tunnel defined therein, an upper inserting portion and a lower inserting portion formed on the outer wall of the inlet connector, and a stopping rib defined between the upper inserting portion and the lower inserting portion; the upper inserting portion is inserted onto the inlet end of the hose assembly; the lower inserting portion is inserted into the first slot of the seat; and the stopping rib abuts against an end wall of the inlet end and an end wall of the seat; the at least one locking block of the inlet connector is located at a bottom end of the lower inserting portion.

The lower inserting portion has two grooves defined on the outer wall thereof so as to retain with two sealing rings.

The outlet connector also has a passageway deformed therein, a mount formed on the outer wall of the outlet connector, an insertion section with a small diameter extending outwardly from the mount; a stop fence arranged on a connection of the mount and the insertion section; the insertion section is inserted to the outlet end of the hose and is abutted by the stop fence and an end wall of the outlet end; the at least one boss of the outlet connector is arranged around the outer wall of the mount.

The hose, the inlet connector, and the outlet connector are integrally formed from plastic material.

Thereby, in assembly, the inlet connector of the hose assembly is inserted to the second segment from the first segment through the channel, and then the four bosses of the outlet connector retain in the first recesses of the first segment so that the hose assembly does not disengage from the metal tube, such that the inlet connector of the hose assembly is inserted into the seat, and then the seat is rotated 90 degrees so that two apertures of the seat align with the two screwing holes of the pedestal of the metal tube. Due to the two locking blocks of the inlet connector retain with the two opposite retaining faces of the seat, the seat is fixed on the inlet connector of the hose assembly securely so that the two bolts screw with the two screwing holes via the two apertures, thus finishing assembly easily and quickly.

The hose assembly connects with the seat securely so that the metal tube is isolated completely without contacting water, hence the metal tube is made of zinc alloy material instead of copper material. Also, the hose assembly and the seat are made of plastic material so as to avoid lead extraction in a faucet, to prevent from lead pollution, and to reduce material cost.

In addition, the hose assembly and the seat are integrally formed from plastic material so as to reduce material cost, to prevent from lead pollution, and to enhance production efficiency.

DETAILED DESCRIPTION OF THE PREFERRED EMBODIMENTS

Figure 1:
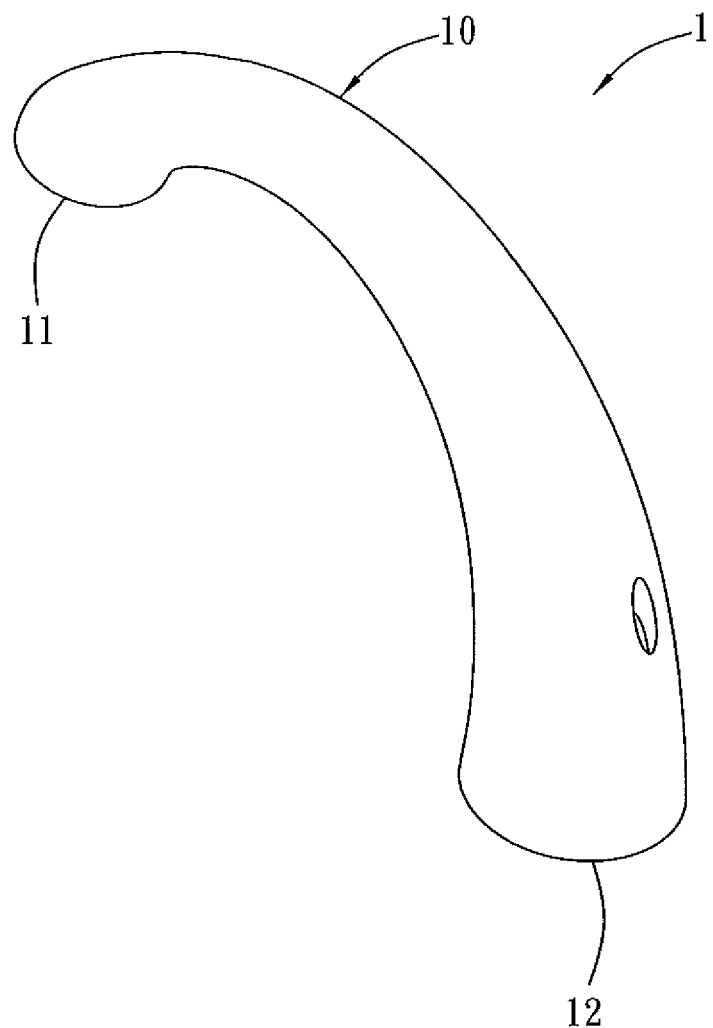
FIG. 1 is a perspective view showing the assembly of an outlet pipe structure of a faucet according to a preferred embodiment of the present invention.

Referring further to FIGS. 1-4, an outlet pipe structure of a faucet according to a preferred embodiment of the present invention comprises: an outlet pipe 1 including a metal tube 10, a hose assembly 20, a seat 30, and two coupling bolts 40.

Figure 4:
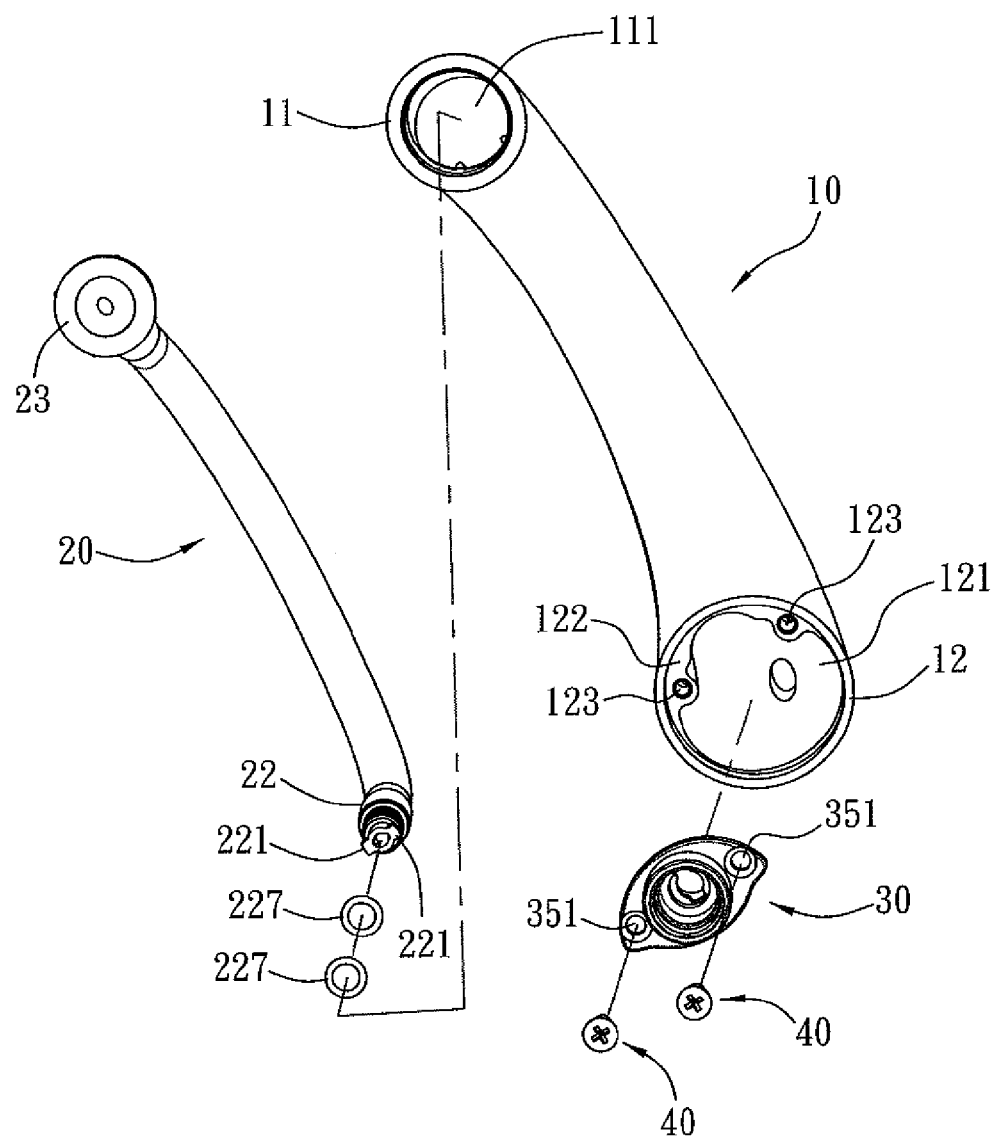
FIG. 4 is a perspective view showing the exploded components of the outlet pipe structure of the faucet according to the preferred embodiment of the present invention.
Figure 5:
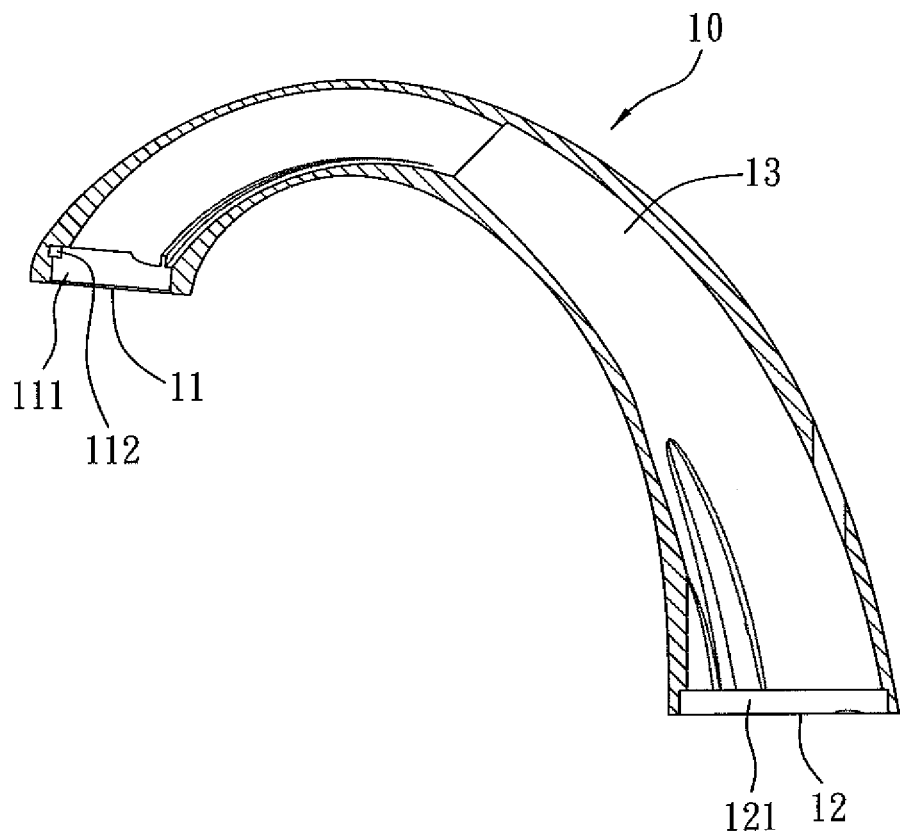
FIG. 5 is a cross sectional view showing the assembly of a metal tube of the outlet pipe structure of the faucet according to the preferred embodiment of the present invention.

As shown in FIG. 5, the metal tube 10 includes a first segment 11, a second segment 12, and a channel 13 communicating with the first segment 11 and the second segment 12. The first segment 11 has a first recess 112 defined on an inner wall thereof adjacent to a first opening 111, and the second segment 12 has a pedestal 122 disposed on a peripheral side of a second opening 121 as illustrated in FIG. 4.

The metal tube 10 is made of zinc alloy material, and the pedestal 122 of the second segment 12 of the metal tube 10 has two screwing holes 123.

Figure 3:
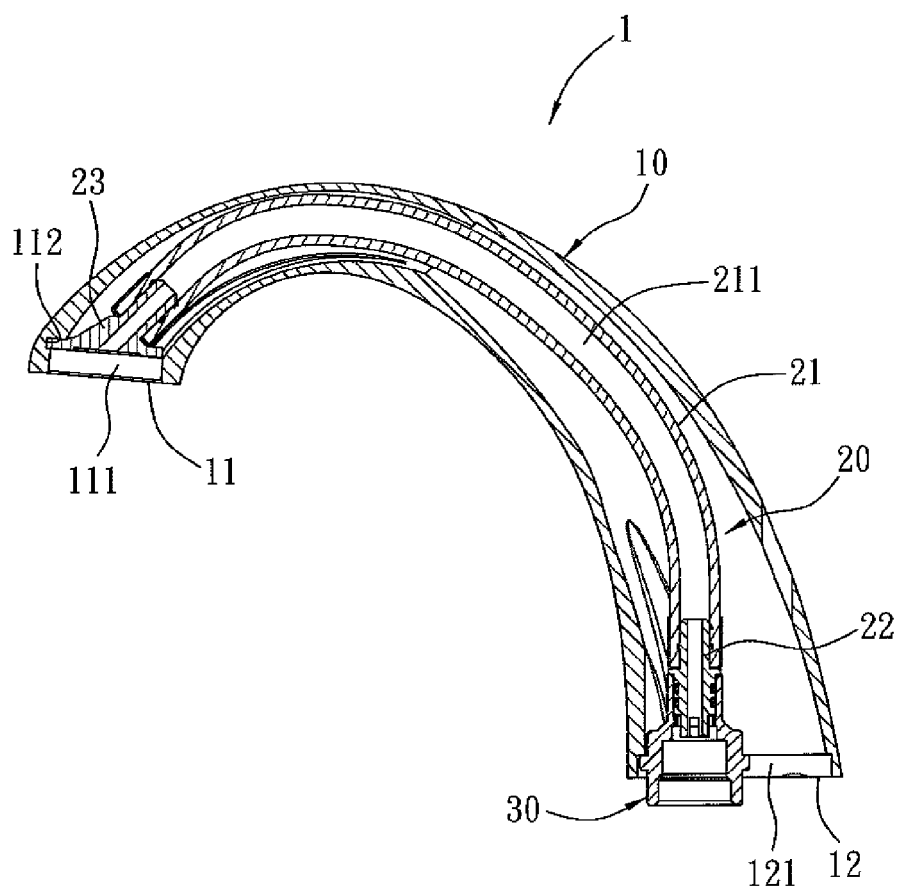
FIG. 3 is a cross sectional view showing the assembly of the outlet pipe structure of the faucet according to the preferred embodiment of the present invention.
Figure 6:
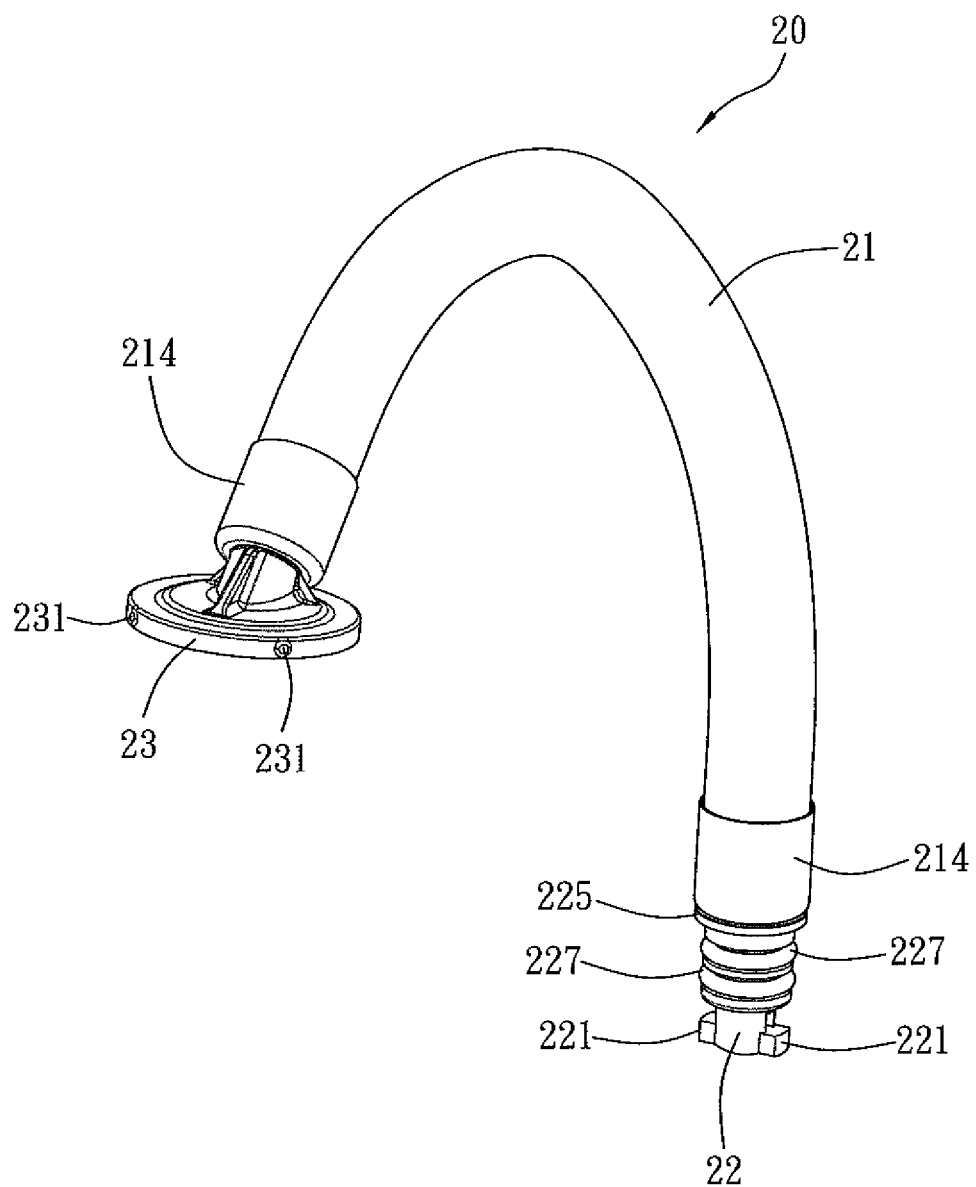
FIG. 6 is a perspective view showing the assembly of a hose assembly of the outlet pipe structure of the faucet according to the preferred embodiment of the present invention.
Figure 7:
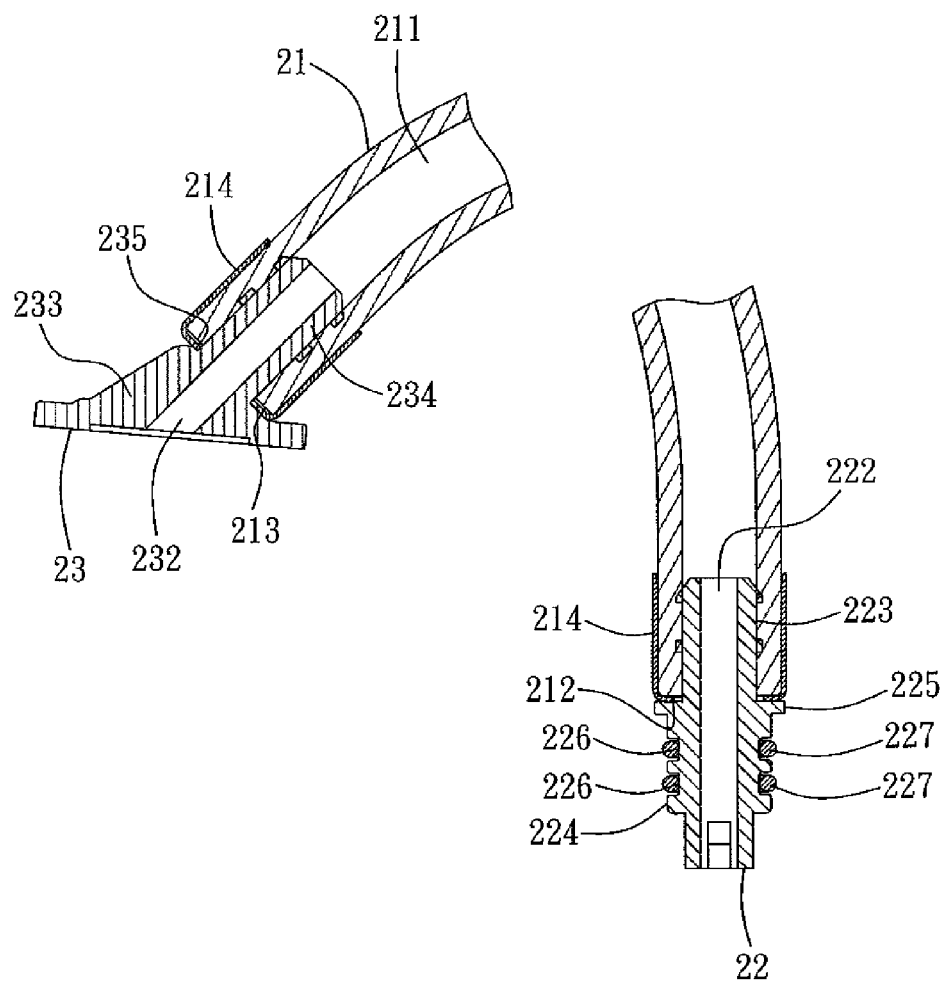
FIG. 7 is a cross sectional view showing the assembly of a part of the hose assembly of the outlet pipe structure of the faucet according to the preferred embodiment of the present invention.
Figure 8:
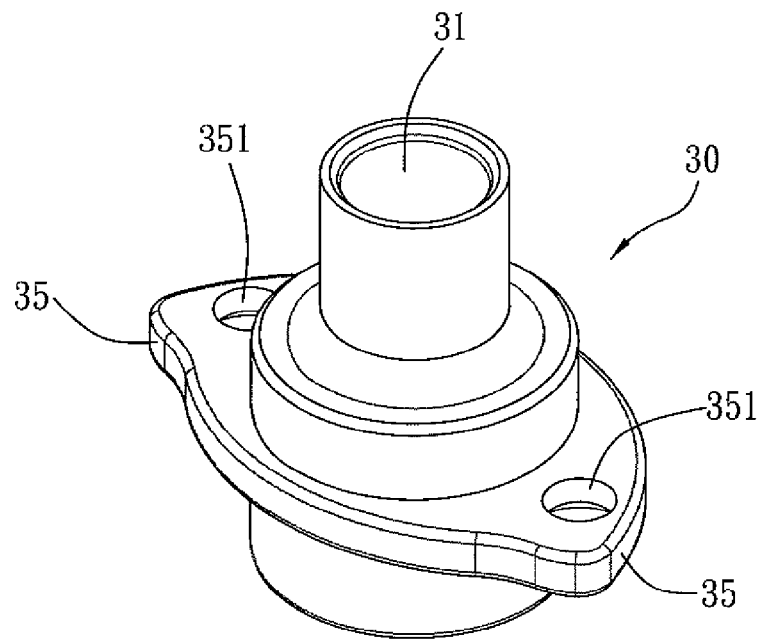
FIG. 8 is a perspective view showing the assembly of a seat of the outlet pipe structure of the faucet according to the preferred embodiment of the present invention.
Figure 9:
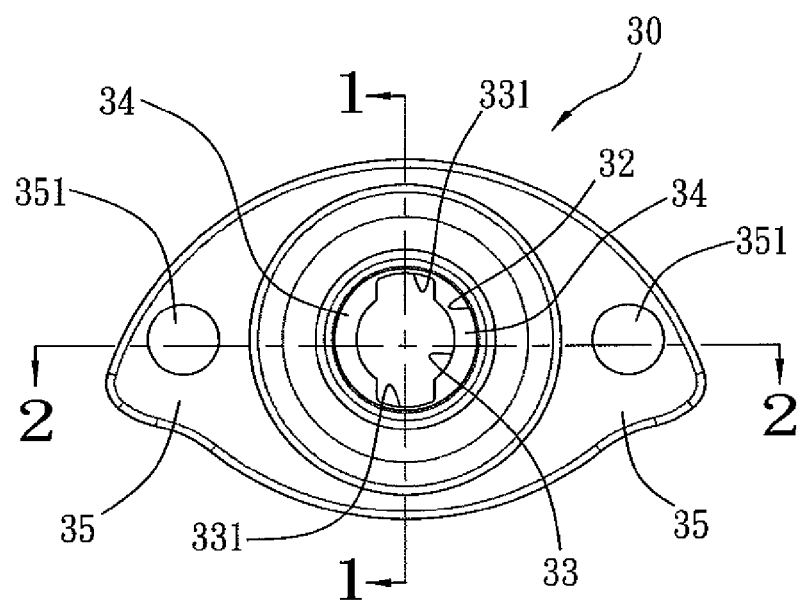
FIG. 9 is a plan view showing the assembly of the seat of the outlet pipe structure of the faucet according to the preferred embodiment of the present invention.
Figure 10:
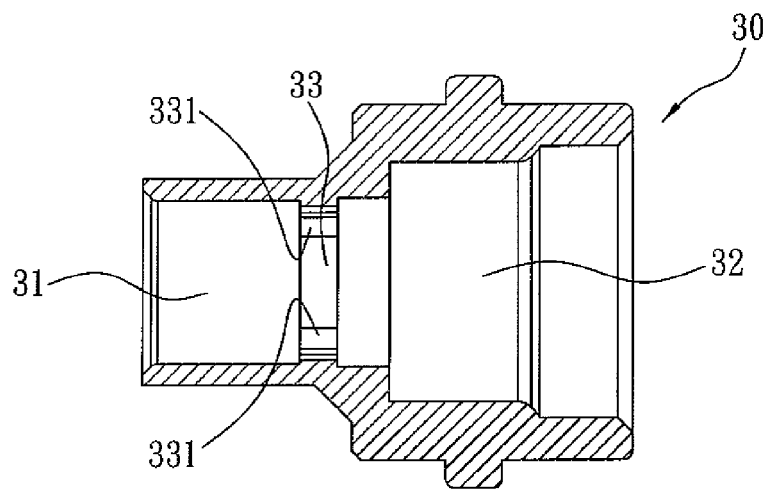
FIG. 10 is a cross sectional view taken along lines 1-1 of FIG. 9.
Figure 11:
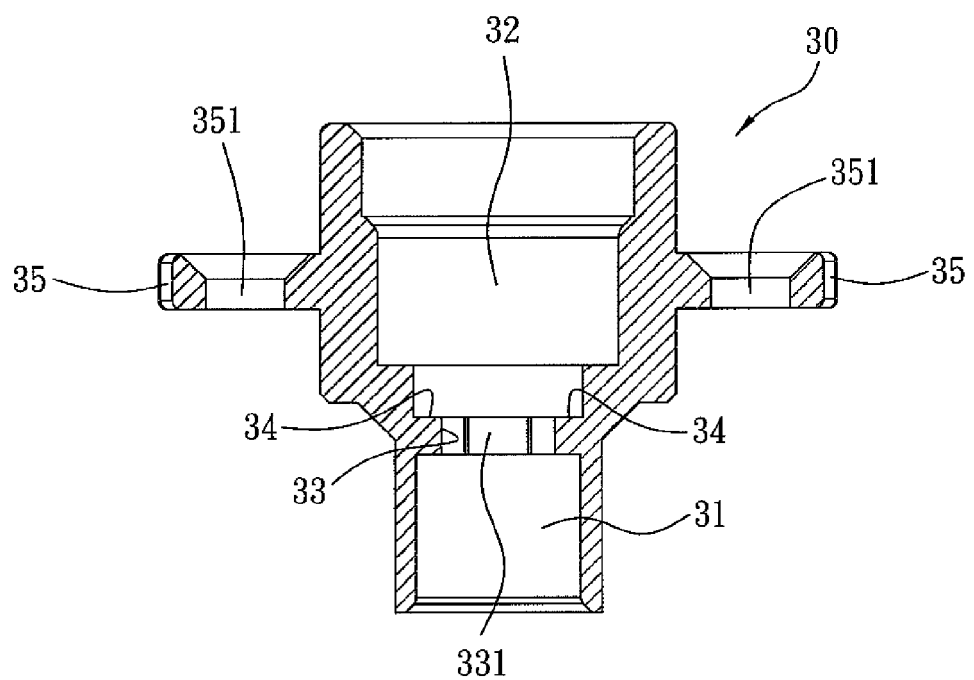
FIG. 11 is a cross sectional view taken along lines 2-2 of FIG. 9.

Referring further to FIGS. 6 and 7, the hose assembly 20 includes: a hose 21 having a passage 211, an inlet end 212, and an outlet end 213; an inlet connector 22 connected with the inlet end 212 and having two locking blocks 221 symmetrically mounted on an outer wall of the inlet connector 22; an outlet connector 23 coupled with the outlet end 213 and having four bosses 231 isometrically arranged around an outer wall of the outlet connector 23. The hose assembly 20 is inserted from the first segment 11 of the metal tube 10 such that the inlet connector 22 reaches to the second segment 12 via the channel 13 as shown in FIG. 3, and one of the four bosses 231 retains in the first recess 112 so that the hose assembly 20 is fixed in the metal tube 10 securely.

With reference to FIG. 7, the inlet connector 22 also has a tunnel 222 defined therein, an upper inserting portion 223 and a lower inserting portion 224 formed on the outer wall of the inlet connector 22, and a stopping rib 225 defined between the upper inserting portion 223 and the lower inserting portion 224. The upper inserting portion 223 is inserted onto the inlet end 212 of the hose assembly 20, and the stopping rib 225 abuts against an end wall of the inlet end 212. The two locking blocks 221 of the inlet connector 22 are located at a bottom end of the lower inserting portion 224. The lower inserting portion 224 has two grooves 226 defined on the outer wall thereof so as to retain with two sealing rings 227.

Referring to FIG. 7, the outlet connector 23 also has a passageway 232 deformed therein, a mount 233 formed on the outer wall of the outlet connector 23, an insertion section 234 with a small diameter extending outwardly from the mount 233; a stop fence 235 arranged on a connection of the mount 233 and the insertion section 234. The insertion section 234 is inserted to the outlet end 213 of the hose 21 and is abutted by the stop fence 235 and an end wall of the outlet end 213. The four bosses 231 of the outlet connector 23 are arranged around an outer wall of the mount 233.

To enhance tightness of the upper inserting portion 223, the inlet end 212, the insertion section 234, and the outlet end 213, a respective one of the inlet end 212 and the outlet end 213 is covered by a sleeve 214 made of metal material or hard plastic material so as to limit an outward expansion of the inlet end 212 and the outlet end 213.

The hose 21, the inlet connector 22, and the outlet connector 23 are integrally formed from plastic material.

Figure 2:
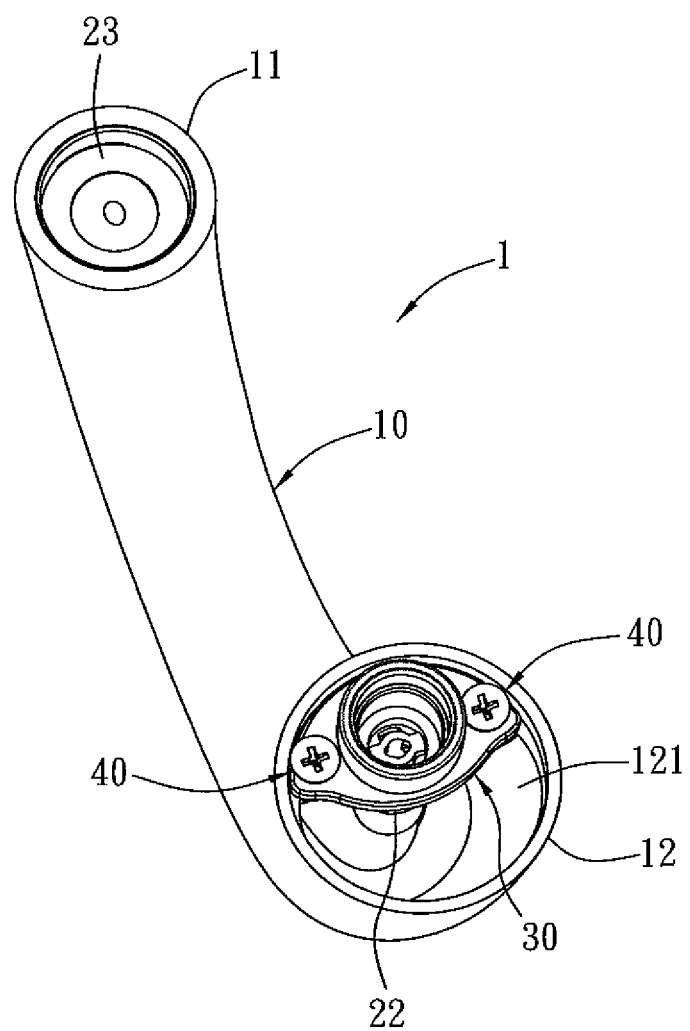
FIG. 2 is another perspective view showing the assembly of the outlet pipe structure of the faucet according to the preferred embodiment of the present invention.
Figure 12:
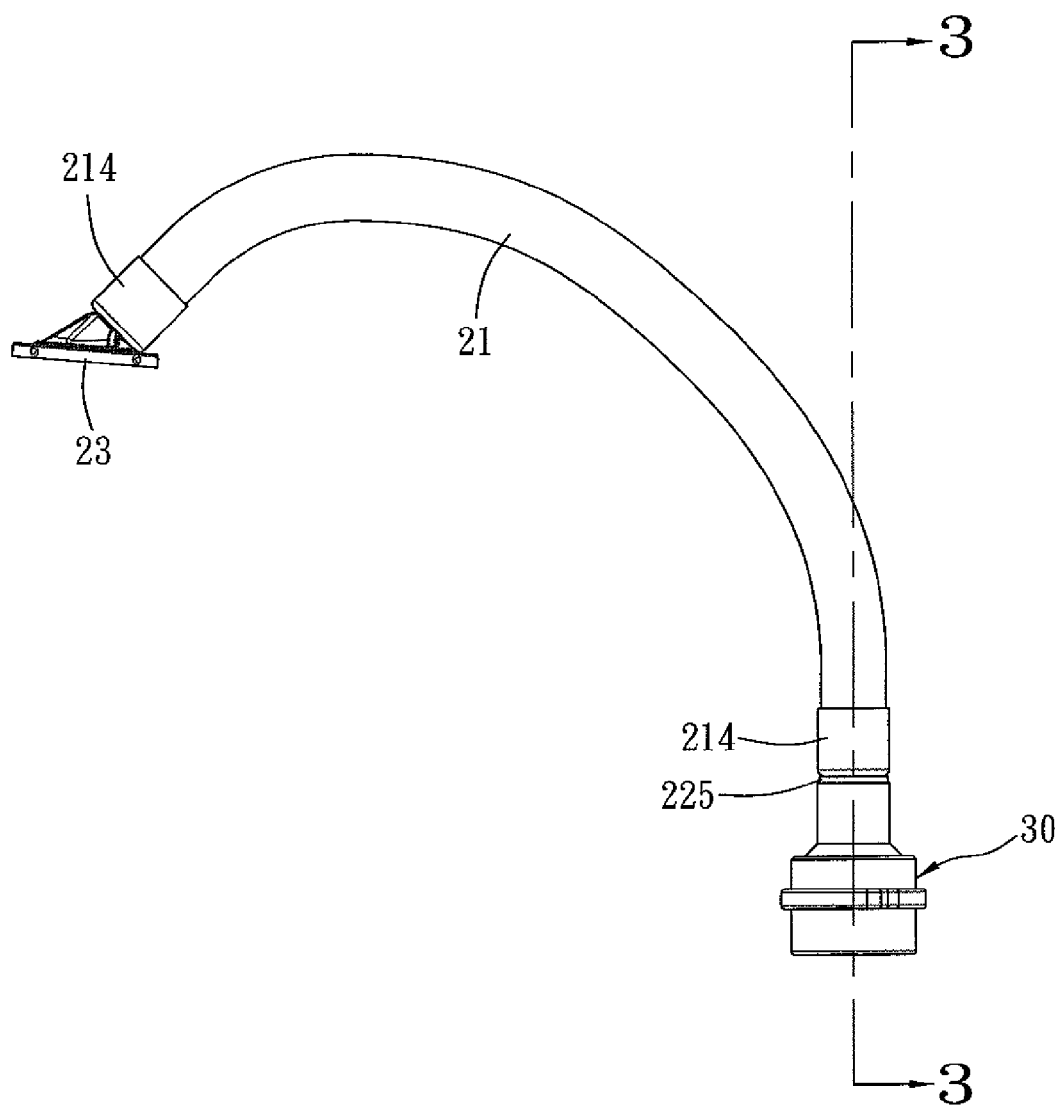
FIG. 12 is a plan view showing the assembly of the hose assembly and the seat of the outlet pipe structure of the faucet according to the preferred embodiment of the present invention.

With reference to FIGS. 8-11, the seat 30 includes a first slot 31, a second slot 32, a connecting orifice 33 communicating with the first slot 31 and the second slot 32. The connecting orifice 33 has two troughs 331 symmetrically defined on an inner wall thereof and has two opposite retaining faces 34 formed on one side of the seat 30 relative to the second slot 32. The lower inserting portion 224 of the inlet connector 22 is inserted into the first slot 31 of the seat 30 and is engaged by the two sealing rings 227 and an inner wall of the first slot 31 as shown in FIGS. 12 and 3, and the stopping rib 225 is retained by an end wall of the seat 30 relative to the first slot 31, the two locking blocks 221 pass through the two troughs 331 and retain with the two opposite retaining faces 34 after the seat 30 rotates 90 degrees clockwisely or anti-clockwisely, such that the seat 30 is fixed on the inlet connector 22 of the hose assembly 20. The seat 30 also includes two coupling tabs 35 formed on an outer wall thereof and coupling with the pedestal 122 of the second segment 12 after the seat 30 is fixed as illustrated in FIGS. 2 and 4. Also, each coupling tab 35 has an aperture 351.

The seat 30 is integrally formed from plastic material.

Before the lower inserting portion 224 connects with the first slot 31 of the seat 30, the two sealing rings 227 of the lower inserting portion 224 are applied silicone oil so as to increase lubricity of the two sealing rings 227, such that the lower inserting portion 224 is retained in the first slot 31 smoothly.

Referring further to FIG. 4, each bolt 40 is screwing with a respective one of the two screwing holes 123 of the pedestal 122 via the aperture 351 of the each coupling tab 35, such that the seat 30 is screwed with the pedestal 122 of the metal tube 10.

Figure 13:
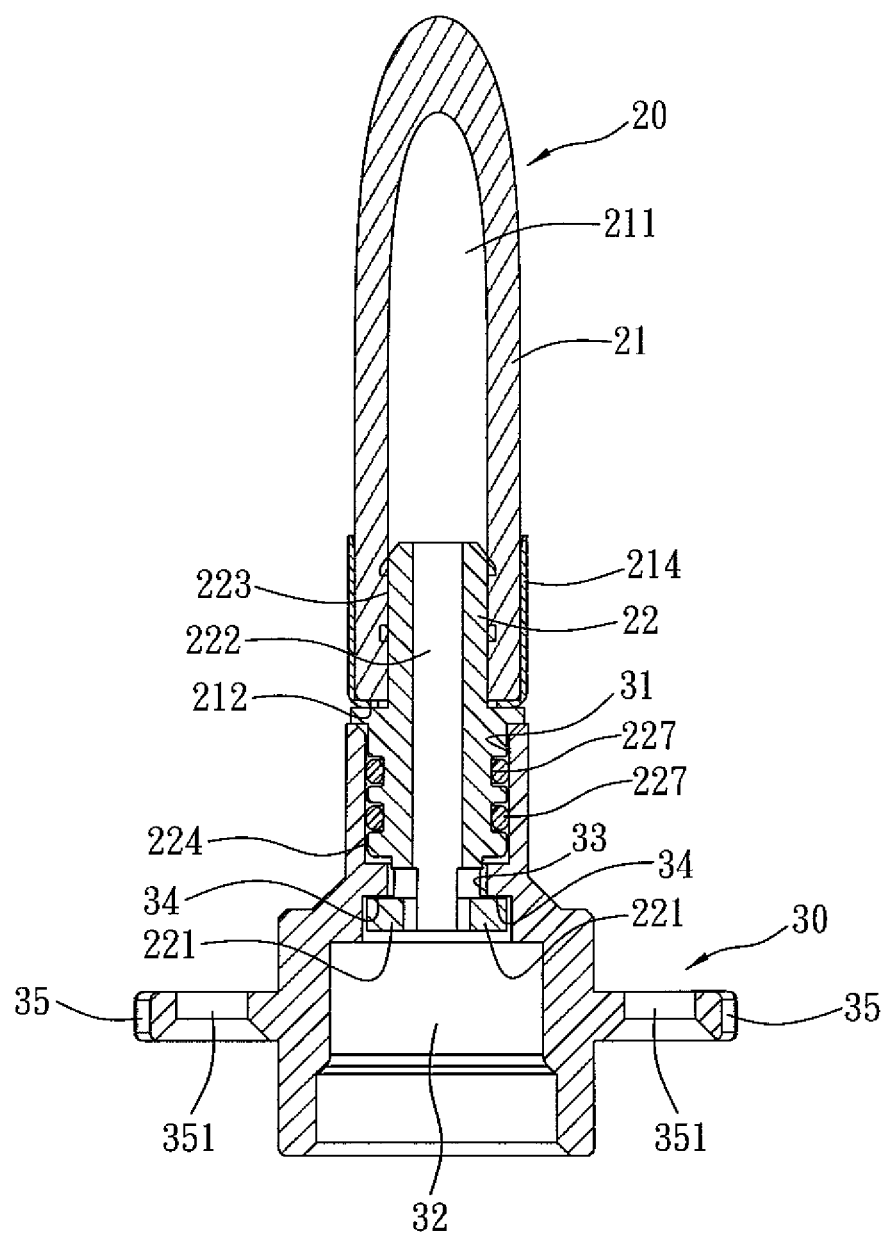
FIG. 13 is a cross sectional view taken along lines 3-3 of FIG. 12.

With reference to FIGS. 3 and 4, in assembly, the inlet connector 22 of the hose assembly 20 is inserted to the second segment 12 from the first segment 11 through the channel 13, and then the four bosses 231 of the outlet connector 23 retain in the first recesses 112 of the first segment 11 so that the hose assembly 20 does not disengage from the metal tube 10, such that the inlet connector 22 of the hose assembly 20 is inserted into the seat 30, and then the seat 30 is rotated 90 degrees so that two apertures 351 of the seat 30 align with the two screwing holes 123 of the pedestal 122 of the metal tube 10. Due to the two locking blocks 221 of the inlet connector 22 retain with the two opposite retaining faces 34 of the seat 30 as illustrated in FIG. 13, the seat 30 is fixed on the inlet connector 22 of the hose assembly 20 securely so that the two bolts 40 screw with the two screwing holes 123 via the two apertures 351, thus finishing assembly easily and quickly.

The hose assembly 20 connects with the seat 30 securely so that the metal tube 10 is isolated completely without contacting water, hence the metal tube 10 is made of zinc alloy material instead of copper material. Also, the hose assembly 20 and the seat 30 are made of plastic material so as to avoid lead extraction in a faucet, to prevent from lead pollution, and to reduce material cost.

In addition, the hose assembly 20 and the seat 30 are integrally formed from plastic material so as to reduce material cost, to prevent from lead pollution, and to enhance production efficiency.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An outlet pipe structure of a faucet comprising:
a metal tube including a first segment, a second segment, and a channel communicating with the first segment and the second segment; the first segment having a first recess defined on an inner wall thereof adjacent to a first opening; and the second segment having a pedestal disposed on a peripheral side of a second opening;
a hose assembly including a hose having a passage, an inlet end, and an outlet end; an inlet connector connected with the inlet end and having at least one locking block mounted on an outer wall of the inlet connector; an outlet connector coupled with the outlet end and having at least one boss arranged around an outer wall of the outlet connector; the hose assembly being inserted from the first segment of the metal tube such that the outlet connector reaches to the second segment via the channel, and one of the at least one boss retains in the first recess so that the hose assembly is fixed in the metal tube;
a seat including a first slot, a second slot, a connecting orifice communicating with the first slot and the second slot; the connecting orifice having at least one trough defined on an inner wall thereof and having two opposite retaining faces formed on one side of the seat relative to the second slot; the at least one locking block passing through the at least one trough and retaining with the two opposite retaining faces after the seat rotates a predetermined degree, such that the seat is fixed on the inlet connector of the hose assembly; the seat also including at least one coupling tab formed on an outer wall thereof and coupling with the pedestal of the second segment after the seat is fixed.

2. The outlet pipe structure of the faucet as claimed in claim 1 further comprising two bolts, the pedestal of the second segment of the metal tube having two screwing holes; the seat also including two coupling tabs formed on the outer wall thereof, and each coupling tab having an aperture; each bolt screwing with a respective one of the two screwing holes of the pedestal via the aperture of the each coupling tab, such that the seat is screwed with the pedestal of the metal tube.

3. The outlet pipe structure of the faucet as claimed in claim 1, characterized in that the inlet connector has two locking blocks symmetrically mounted the outer wall thereof; the connecting orifice has two troughs symmetrically defined on the inner wall thereof so as to insert the two locking blocks and to retain with the two opposite retaining faces after the seat rotates 90 degrees clockwisely or anticlockwisely.

4. The outlet pipe structure of the faucet as claimed in claim 1, characterized in that the outlet connector has four bosses isometrically arranged around the outer wall thereof so that one of the four bosses retains in the first recess.

5. The outlet pipe structure of the faucet as claimed in claim 1, characterized in that the inlet connector also has a tunnel defined therein, an upper inserting portion and a lower inserting portion formed on the outer wall of the inlet connector, and a stopping rib defined between the upper inserting portion and the lower inserting portion; the upper inserting portion is inserted onto the inlet end of the hose assembly; the lower inserting portion is inserted into the first slot of the seat; and the stopping rib abuts against an end wall of the inlet end and an end wall of the seat; the at least one locking block of the inlet connector is located at a bottom end of the lower inserting portion.

6. The outlet pipe structure of the faucet as claimed in claim 5, characterized in that the lower inserting portion has two grooves defined on the outer wall thereof so as to retain with two sealing rings.

7. The outlet pipe structure of the faucet as claimed in claim 1, characterized in that the outlet connector also has a passageway formed therein, a mount formed on the outer wall of the outlet connector, an insertion section with a small diameter extending outwardly from the mount; a stop fence arranged on a connection of the mount and the insertion section; the insertion section is inserted to the outlet end of the hose and is abutted by the stop fence and an end wall of the outlet end; the at least one boss of the outlet connector is arranged around the outer wall of the mount.

8. The outlet pipe structure of the faucet as claimed in claim 1, characterized in that the metal tube is made of zinc alloy material.

9. The outlet pipe structure of the faucet as claimed in claim 1, characterized in that the hose, the inlet connector, and the outlet connector are integrally formed from plastic material.

10. The outlet pipe structure of the faucet as claimed in claim 1, characterized in that the seat is integrally formed from plastic material.

11. The outlet pipe structure of the faucet as claimed in claim 1, characterized in that a respective one of the inlet end and the outlet end is covered by a sleeve so as to limit an outward expansion of the inlet end and the outlet end.

* * * * *